Aug. 16, 1960 R. HAYLER 2,948,965
MEASURING INSTRUMENT
Filed Jan. 12, 1959
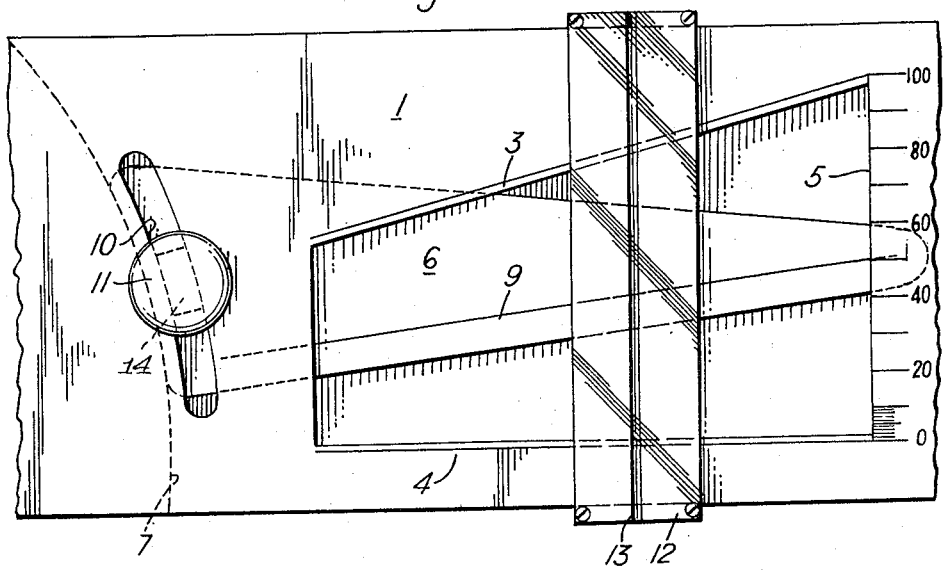
Fig. 1.
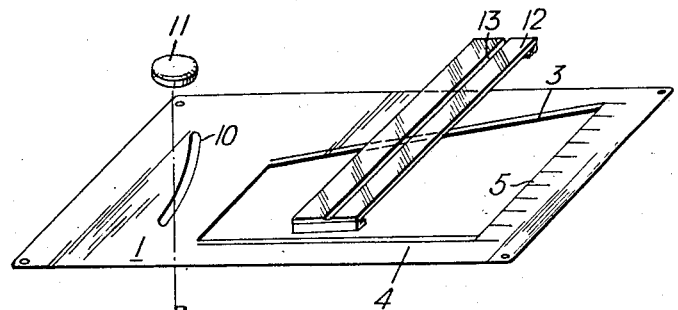
Fig. 2.
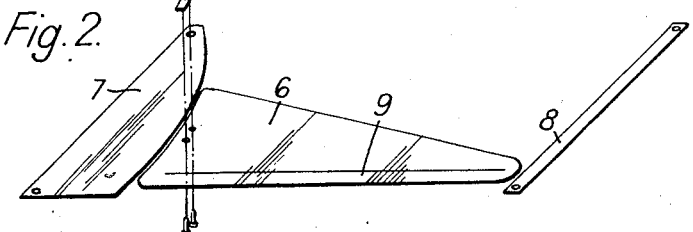
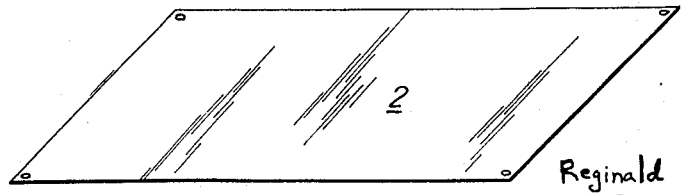
Inventor:
Reginald HAYLER
By:
Wenderoth, Lind & Ponack
Attorneys

United States Patent Office 2,948,965
Patented Aug. 16, 1960

2,948,965

MEASURING INSTRUMENT

Reginald Hayler, Lancing, England, assignor to Hawksley & Sons, Limited, London W. 1, England Filed Jan. 12, 1959, Ser. No. 786,207

1 Claim. (Cl. 33—125)

This invention relates to measuring instruments and in particular to an instrument for measuring, as a percentage of the total length, a part of a column which may be divided in varying proportions.

The instrument is particularly adapted for use in the measurement of the percentage of solids in suspension in a liquid contained in a relatively long and thin tube after the solids have been separated from the liquid by centrifugal action. For example, in blood testing it is known to centrifuge a sample contained in a tube which is disposed radially on a rotating table so as to separate the blood cells from the plasma, and in conducting such tests it is desirable to be able quickly and simply to determine the quantity of blood cells as a percentage of the total volume, it being understood that it is inconvenient to arrange matters so that the total quantity of blood, that is the length of the liquid column in the tube, is always the same.

It is an object of the present invention to provide a simple instrument which enables such measurements to be effected both accurately and quickly.

The improved instrument of this invention comprises a flat member which is formed or provided with three straight lines representing the base and part of the perpendicular and hypotenuse of a right-angled triangle, the base being provided with a scale divided conveniently into a hundred equal divisions. A cursor, conveniently formed of transparent material and adapted to carry a specimen tube so that the tube extends parallel with the base, is slidable on the member towards and away from the base line, so as to enable the ends of the column in the tube to intersect the perpendicular and hypotenuse lines. A straight reference line which is movable as a radius about a centre defined by the intersection of the hypotenuse and perpendicular lines is then moved so that it intersects the division in the column when the reading on the scale at the point where the reference line intersects the base line will give the required percentage length of the part of the column.

One convenient form of the instrument of this invention is shown in the accompanying drawing in which Figure 1 is a plan view and Figure 2 an exploded perspective view.

As shown, the instrument consists of two rectangular metal plates 1 and 2 which are secured one on the other with a small separation. The top plate 1 is provided with straight lines 3 and 4 which represent part of the hypotenuse and perpendicular of the measuring triangle, and the central portion between these lines is cut away and provides a straight edge 5 which constitutes the base of the measuring triangle, the base 5 being parallel with and adjacent to one of the two shorter edges of the rectangular plate 1. This plate 1 is also suitably provided, for example by engraving, with a scale which divides the base preferably into a hundred equal divisions. Slidably arranged between the two plates is a third and reference plate 6 which is of triangular shape having its narrowest side positioned remote from the base 5 of the measuring triangle and seated on the part circular edge of a guide plate 7 which also acts as a spacer and is secured between the top and bottom plates adjacent the shorter edge remote from the base 5. A suitable spacer 8 is also secured between the plates at the shorter edges adjacent the base 5. The circle of which the edge of the guide plate 7 forms a part is centered on the point where the perpendicular 4 and hypotenuse 3 of the measuring instrument would intersect if extended and the reference plate 7 is marked with a straight line 9 which extends normal to this circle.

The top plate 1 is also formed with an arcuate slot 10 through which a knob 11 fixed with the reference plate 6 extends and a light spring 14 is provided which holds the base of the reference plate 6 in engagement with the circular edge of the guide plate 7. By means of the knob 11 the reference plate 6 may be moved between limiting positions in which the reference line 9 of this plate coincides with the perpendicular 4 and hypotenuse 3 of the measuring triangle.

A cursor 12, preferably of a transparent material such as plastic, is arranged to be slidable on the top plate 1 towards and away from the base 5 of the measuring triangle and is provided with a groove 13 in which the sample tube may be located; if desired a suitable clamp may be provided for holding this tube on the cursor in its adjusted position. The cursor may also be provided with a cylindrical lens which extends over the specimen tube and facilitates observation of the intersection of the liquid/air or liquid/solid interface with the sides of the measuring triangle and the reference line.

In use, the specimen tube is arranged on the cursor 12 so that the bottom of the column in the tube coincides with the perpendicular 4 of the measuring triangle and the cursor is then moved so that the liquid meniscus at the other end of the column intersects the hypotenuse 3 of the measuring triangle. If the reference line 9 is then moved so that it intersects the interface between, for example, the liquid and solids in the tube, the intersection of this reference line with the base 5 of the measuring triangle will indicate a point on the scale corresponding to the percentage of solids in the sample.

It will be appreciated that the construction of this instrument may be varied in several respects. For example the top plate 1 need not be provided with a cutout. Instead it could be formed of a suitable transparent material on which lines defining the sides and base of the measuring triangle could be engraved.

I claim:

An instrument of the character described comprising a first and a second plate-like member secured together in spaced superimposed relation, said first plate-like member being formed with three straight lines representing respectively the base and part of the hypotenuse and perpendicular of a right-angled triangle, a guide member secured between said first and second members and having a part circular edge, the circle of which the edge of said guide member forms a part being centered on a point where the hypotenuse and perpendicular lines would intersect if extended, a reference member movably mounted between said first and second members being of generally triangular shape and having the base portion toward the point at which said circle has its center, the apex portion of said reference member extending to beneath said base line on said first plate member, the edge of said base portion being curved and being in engagement with the said part circular edge of said guide member, said reference member being formed with a straight reference line extending in a radial direction from said point, and a cursor slidably mounted on said first member for movement in a direction normal to the said base line.

References Cited in the file of this patent

UNITED STATES PATENTS

| | | |
|---|---|---|
| 161,392 | Dodd | Mar. 30, 1875 |
| 495,828 | Nichols | Apr. 18, 1893 |
| 2,900,730 | Gilman | Aug. 25, 1959 |
| 2,906,025 | Drummond et al. | Sept. 29, 1959 |

FOREIGN PATENTS

| | | |
|---|---|---|
| 937,335 | France | Mar. 8, 1948 |